United States Patent [19]

Tardif

[11] Patent Number: 5,737,859
[45] Date of Patent: Apr. 14, 1998

[54] EARTH LEVELING APPARATUS

[75] Inventor: Jean-Roch Tardif, Riviére-Du-Loup, Canada

[73] Assignee: Tardif & Frere (1993), Quebec, Canada

[21] Appl. No.: 632,096

[22] Filed: Apr. 15, 1996

[51] Int. Cl.[6] ........................................ E02F 5/00
[52] U.S. Cl. ........................... 37/389; 37/350; 37/189; 172/452; 172/327
[58] Field of Search ......................... 37/242, 350, 351, 37/189, 190, 462–465, 244–257, 389; 172/327, 328, 452–454

[56] References Cited

U.S. PATENT DOCUMENTS

| | | | |
|---|---|---|---|
| 2,650,460 | 9/1953 | Newhouse | 37/189 |
| 2,665,655 | 1/1954 | Brown et al. | 37/189 |
| 3,091,873 | 6/1963 | West | 37/350 X |
| 3,318,638 | 5/1967 | Kilbourne | 37/189 X |
| 3,962,803 | 6/1976 | O'Brien | 37/189 X |
| 4,819,348 | 4/1989 | DeBolt | 37/350 |
| 4,912,862 | 4/1990 | Bishop et al. | 37/351 X |
| 5,113,610 | 5/1992 | Liebrecht, Jr. | 37/189 X |
| 5,214,867 | 6/1993 | Weatherly et al. | 37/189 X |

*Primary Examiner*—Terry Lee Melius
*Assistant Examiner*—Victor Batson
*Attorney, Agent, or Firm*—Birch, Stewart, Kolasch & Birch, LLP

[57] ABSTRACT

An earth leveling apparatus includes a vehicle having runners for movement in an operative direction, an elongated screw mounted to the vehicle and rotatable on its axis, and extending transversely of the operative direction of movement of the vehicle, and an apparatus for rotating the screw, the screw having a spiral blade with an edge adapted to engage earth to move it along the length of the screw as the vehicle advances in the operative direction so as to level the earth.

6 Claims, 3 Drawing Sheets

EARTH LEVELING APPARATUS

BACKGROUND OF THE INVENTION

1. Field of the invention

The present invention relates to an earth leveling apparatus of the type generally referred to as graders and more particularly to a grader to be trailed behind a tractor either in an earth leveling or road transport mode.

2. Description of the Prior Art

There are different types of earth levelings, or graders as they are better known. The most common road grader is a blade grader consisting of a self propelled vehicle having four wheels, two in front and a pair in the rear, with a large wheel base and straddling a plow blade that can be set at an angle to the longitudinal axis as well as an angle to the horizontal. Such graders are normally used for light road leveling or road finishing. Another type of common earth leveling apparatus is a trailed vehicle known as a scraper that consists of a cutting edge and a large bowl or scoop for scooping up mounds; of earth and dumping the scooped up earth in hollow areas. This type of earth leveling apparatus or scraper is used more for the early to intermediate stages of road building or large boulder free land areas to be leveled, i.e. subsequent to rough leveling by a bulldozer.

There is a need for an intermediate earth leveling apparatus that can easily handle large land areas that must be leveled, particularly in agricultural projects such as in leveling fields for cereal farming or for ground preparation for the harvesting of peat moss. A blade grader could not handle the depth required for the rough leveling required in such situations as in a cornfield, previously plowed with shallow drainage ditches between rows, being converted to a hay or wheat field. On the other hand a bulldozer or a scoop type scraper would be under utilized in such a project.

It has also been found that there is a need for an intermediate earth leveling apparatus when preparing a field for harvesting peat moss. In such a situation the top soil and ground cover must be removed in order to be able to scrape the first layers of peat moss.

SUMMARY OF THE INVENTION

It is an aim of the present invention to provide an intermediate earth leveling apparatus to answer the need perceived in the field of agriculture.

It is also an aim of the present invention to provide a leveler device that may be trailed by a conventional farm tractor. The leveler may be of greater width than is permitted on a road but may also be adapted for transport on a highway for moving the device from one site to another.

It is a still further aim of the present invention to provide an earth leveling apparatus that may be adjusted for depth, with the minimum of difficulty.

A construction in accordance with the present invention comprises an earth leveling apparatus including a vehicle having runners for movement in an operative direction, an elongated screw, mounted to the vehicle, rotatable on its axis and extending transversely of the operative direction of movement of the vehicle. The elongated screw has a spiral blade with an edge adapted to engage earth and adapted to move it along the length of the screw as the vehicle advances so as to level the earth.

More specifically the vehicle is a trailed vehicle adapted to be hauled by a tractor in the operative direction. A second set of runner means in the form of transport wheels is mounted to the vehicle for movement in a transport direction at right angles to the axis of the screw whereby the vehicle can be hauled on a highway with the elongated screw in a raised position for transport, and wherein the first and second runner means may be selectively, alternatively raised out of contact with the ground and lowered to be in contact with the ground for alternate movement in one of the transport and operative directions respectively.

The first set of runner means may be wheels that are retractable relative to the vehicle and are located downstream of the vehicle relative to the operative direction, while a trailer pole may be located on the vehicle upstream thereof relative to the operative direction and the axis of the screw may be at an angle other than a right angle to the operative direction. The second runner means are in the form of retractable wheels mounted to the vehicle downstream of the vehicle relative to the transport direction, and a trailer pole may be provided on the upstream portion of the vehicle relative to the transport direction.

Further scope of applicability of the present invention will become apparent from the detailed description given hereinafter. However, it should be understood that the detailed description and specific, examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Having thus generally described the nature of the invention, reference will now be made to the accompanying drawings, showing by way of illustration, preferred embodiments thereof, and in which:

FIG. 3a is a fragmentary perspective view of a detail of the embodiment shown in FIGS. 1 and 3.

Figure 1:
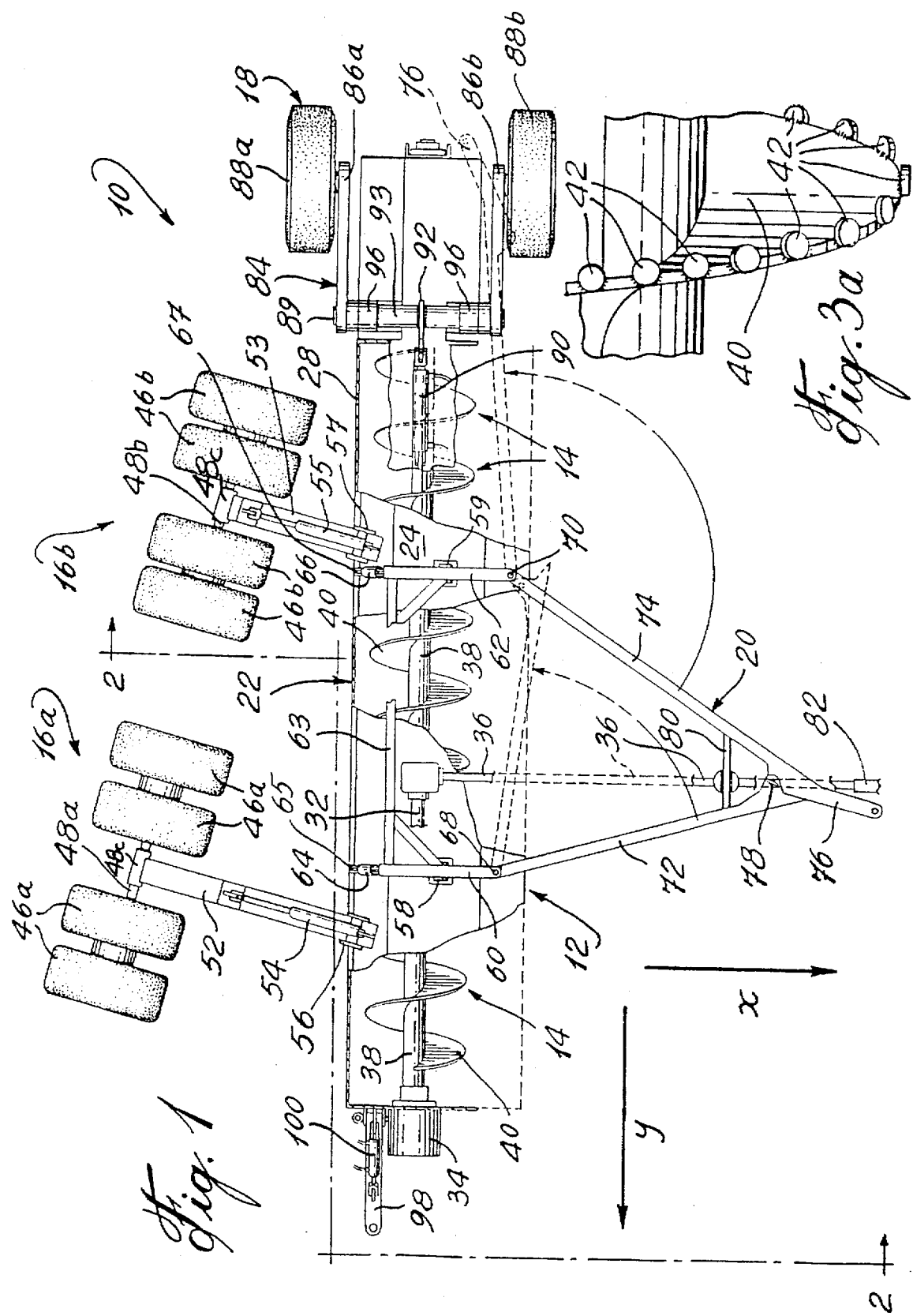
FIG. 1 is a fragmentary top plan view of an earth leveling apparatus in accordance with the present invention deployed in an operative condition.
Figure 2:
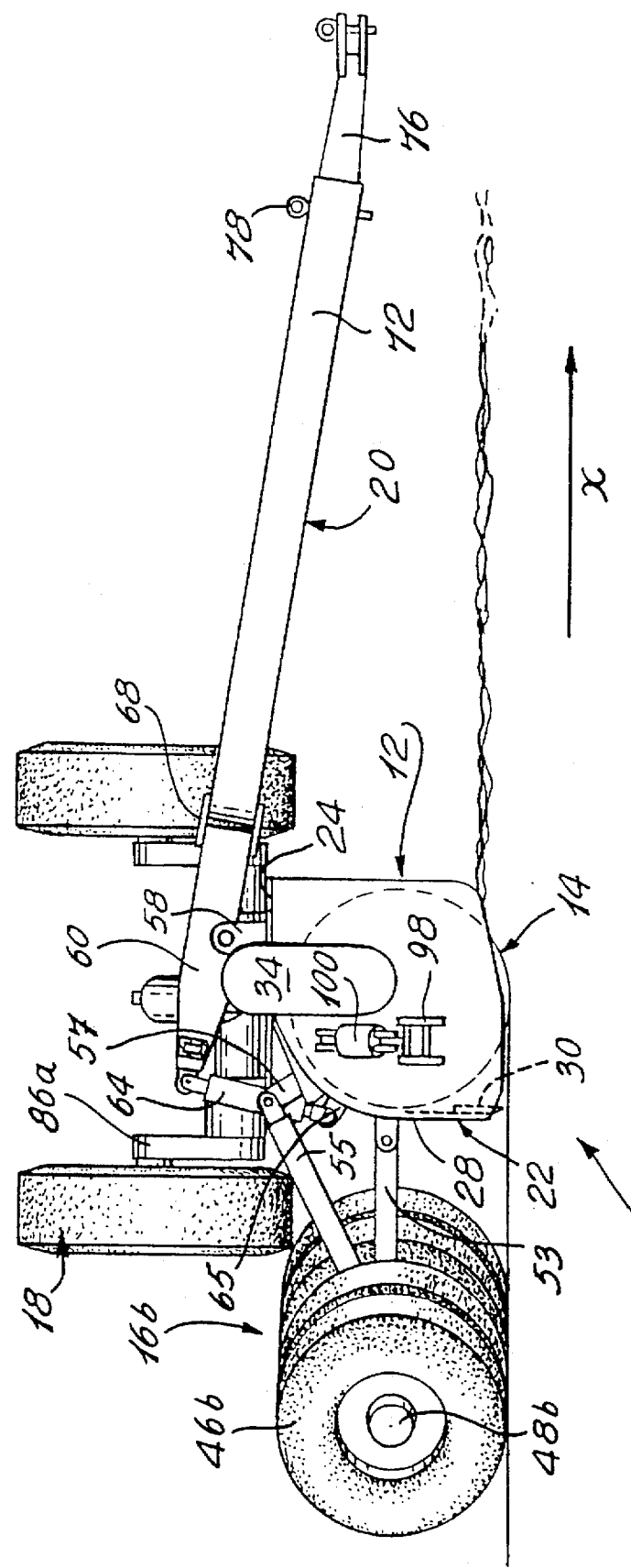
FIG. 2 is an end elevation of the earth leveling apparatus embodiment taken along line 2—2 in FIG. 1.

Referring now to the drawings the earth leveling apparatus is shown generally at 10 and includes a vehicle 12 with an elongated screw 14. A pair of wheel assemblies 16a and 16b are shown downstream of the vehicle 12 when the earth leveling apparatus 10 is deployed, as shown in FIG. 1, to move in a direction X, that is the operating direction. Transport wheels 18 are normally retracted as shown in FIGS. 1 and 2 when the earth leveling apparatus 10 is in an operative position. A hitch pole assembly 20 is provided on the upstream side of the vehicle 12, deployed when the earth leveling apparatus 10 is in the operative position as shown in FIG. 1.

The vehicle 12 includes a housing 22 with a top wall 24 and an elongated frame 26 associated with the top wall 24. The housing 22 includes a rear wall 28 to which a leveler blade 30 may be provided.

Figure 3:
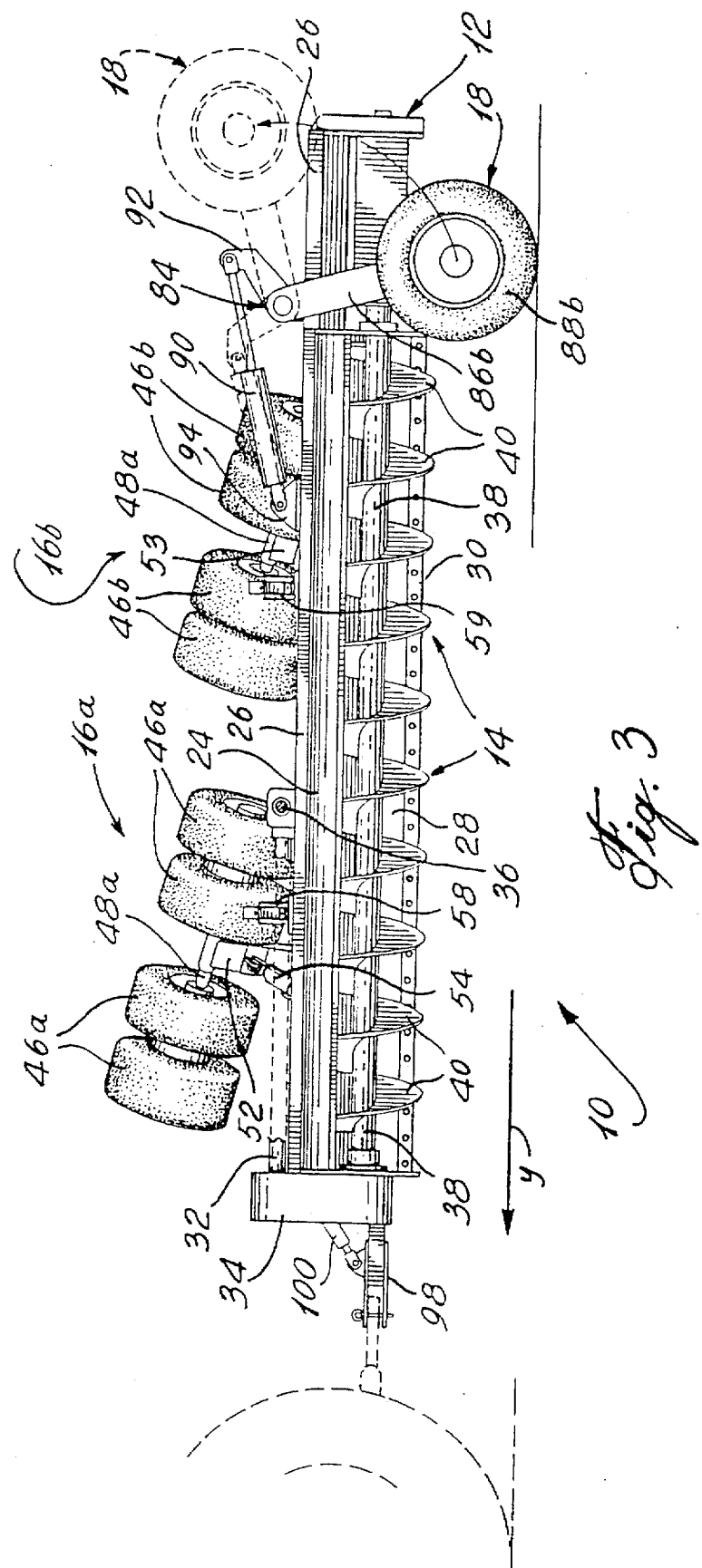
FIG. 3 is a front elevation of the embodiment of the earth leveling apparatus shown in FIG. 1 but with the vehicle in a transport condition.

A drive shaft 32 is shown journaled on the top wall 24 and is connected at one end to the gear box 34. The drive shaft 32 is driven, in turn, by a take-off shaft 36 which may be connected to a tractor drive shaft 82. The screw 14 includes a shaft 38 driven by the drive communicating through the gear box 34. A spiral blade 40 is fixed to the shaft 38 as shown in FIGS. 1 and 3. Teeth 42 may be provided as shown in FIG. 3a and these teeth are placed on the periphery of the blade 40 in the same plane thereof.

The wheel assemblies 16a and 16b are shown in detail in FIGS. 1 and 2. The wheel assembly 16b includes a lever support 53 to which an axle 48b may be journaled and on which pairs of pneumatic tires 46b may rotate freely. Each wheel assembly 16a or 16b may also rotate about a journal 48c and in a plane at right angles to the plane containing lever 52, 53. The wheel assembly 16b is set at an angle to the axis of the screw 14 so that the earth leveling apparatus 10 may be trailed such that the axis of the screw 14 is at an angle other than 90° to the operative direction represented by the arrow X. Wheel assembly 16b may be retracted by piston and cylinder arrangement 55 connected to the bracket 57 on the housing 22 and at the other end to support lever 53. The set of wheels 16a is similar to the set of wheels 16b and is located on the downstream side of the housing 22 at an angle parallel to the axis of the wheel assembly 16b. The wheel assembly 16a may be retracted by means of a piston and cylinder arrangement 54 which is connected at one end to a bracket 56 on the housing 22 and at the other end to the support lever 52.

Thus, the wheel assemblies 16a and 16b may be lowered to engage the ground when the earth leveling apparatus 10 is to be trailed in an operative direction X. The adjustment of the vertical angle of the lever 52 and 53 by means of piston and cylinder arrangement 54 and 55, respectively, will also affect the relative depth that the screw 14 will engage the earth to be leveled.

A pair of beams 60 and 62 connected by brace 63 pivot about the brackets 58 and 59, respectively, on the frame 26. Piston and cylinder 64 and 66 are connected to brackets 65, 67 on the rear wall 28 of the housing 22. Trailer post segments 72 and 74 are connected by means of hinges 68 and 70 to the pivot beams 60 and 62, respectively. The hinges 68 and 70 have generally vertical and parallel hinge axes. Thus, the post segments 72 and 74 remain in the same plane as the pivot beams 60 and 62. The hitch pole assembly 20 also includes a hitch segment 76 that is an extension of the pole segment 74. The pole segments 72 and 74 are connected together by means of a lock pin 78. The hitch 76 can be connected to a tractor such as a typical farm tractor, and once connected, the hitch pole assembly 20 and the pivot beams 60 and 62 will remain relatively constant relative to the horizontal plane. By activating the piston and cylinder arrangements 64 and 66 the housing 22, and thus the blade 30 may be adjusted relative to the hitch pole assembly 20. Thus, the blade 30 on the rear wall 28 may be raised or lowered relative to the tangent of the spiral blade 40 of screw 14.

A brace 80 may also be provided connecting the pole segments 72 and 74 in order to support the takeoff shaft 36.

As can be seen therefore, in an operative position, that is with the wheel assemblies 16a and 16b in contact with the ground, and the hitch pole assembly 20 deployed for trailing the device in a direction X, the depth of the screw 14 relative to the earth may be adjusted both by the height of the wheel assemblies 16a and 16b, and the blade 30 as the adjustment of the housing 22 relative to the pivoting beams 60 and 62.

In operation, the screw is driven so as to engage and remove earth which is above a predetermined level and the earth is seen to move in the direction of the axis of the screw towards the discharge end of the screw, not unlike a plow. Since the axis of the screw 14 is at an angle which is not at 90° to the direction X, the earth will move and be discharged either in hollows or at the discharge end.

The retractable transport wheel assembly 18 includes a lever bracket 84 comprising a pair of arms 86a and 86b to which are mounted transport wheels 88a and 88b journaled to the arms 86a and 86b for free rotation. The arms 86a and 86b are fixed to the pivot shaft 89 journaled in the bearing sleeves 96. A dog-leg bracket 92 is connected to the shaft 93 and a piston and cylinder arrangement 90 which is connected to bracket 94 on the frame 26 can be operated to retract or deploy the transport wheel assembly 18. The wheel assembly 18 will be deployed as shown in FIG. 3 when the wheel assemblies 16a and 16b are retracted and the vehicle 12 is to be transported for road travel.

A hitch pole 98 that can be retracted vertically by means of piston and cylinder arrangement 100 is located at the other end of the vehicle 12 for the purpose of being connected to a tractor. Thus, the vehicle 12 may be trailed in a direction Y with the wheel assemblies 16a and 16b being retracted upwardly and closer to the housing 22. In this transport position, the hitch pole assembly 20 is retracted by removing the lock pin 78 and folding the pole segments 72 and 74 about the hinges 68 and 70, respectively, so that the pole segments 72 and 74 are adjacent the vehicle housing 22 and parallel thereto, as shown in dotted lines in FIG. 1. Thus, the vehicle 12 is limited in width for transport, that is measured at right angles to the axis of the screw 14.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. An earth leveling apparatus comprising:
   a vehicle having first runner means for movement in an operative direction;
   an elongated screw mounted to the vehicle and rotatable on its axis, and extending transversely of the operative direction of movement of the vehicle; and
   means for rotating the screw, the screw having a spiral blade with an edge adapted to engage earth to move the earth along the length of the screw, as the vehicle advances in the operative direction, so as to level the earth,
   wherein the vehicle is a trailed vehicle adapted to be hauled by a tractor in the operative direction with the first runner means in contact with the ground and downstream of the vehicle relative to the operative direction, a second set of runner means in the form of transport wheels is mounted to the vehicle for movement in a transport direction parallel to the axis of the screw,
   whereby the vehicle can be hauled on a highway with the elongated screw in a raised position for transport and wherein the first runner means are raised out of contact with the ground and the second runner means are lowered to be in contact with the ground for movement in the transport direction.

2. The earth leveling apparatus as defined in claim 1, wherein the first runner means may be adjusted vertically to regulate the depth of engagement of the spiral blade of the screw with the earth.

3. The earth leveling apparatus as defined in claim 1, wherein the vehicle includes a housing, including a top wall and a rear wall, and a leveling blade is mounted to the rear wall and the leveling blade can be adjusted relative to the spiral blade of the screw for leveling and grading.

4. The earth leveling apparatus as defined in claim 1, wherein the first set of runner means are wheel assemblies that are retractable relative to the vehicle and are located downstream of the vehicle relative to the operative direction, a first hitch pole means is located on the vehicle upstream thereof relative to the operative direction, and the axis of the screw is at an angle other than a right angle to the operative direction.

5. The earth leveling apparatus as defined in claim 1, wherein the second runner means in the form of retractable wheels are mounted to the vehicle downstream of the vehicle relative to the transport direction, and a retractable second hitch pole means may be provided on the upstream portion of the vehicle relative to the transport direction for engagement with a tractor.

6. The earth leveling apparatus as defined in claim 5, wherein the second hitch pole means is pivotally mounted to the housing, and piston and cylinder arrangements are provided between the pivotally mounted second hitch pole means and the housing for adjusting the angle of the second hitch pole means relative to the housing.

* * * * *